United States Patent [19]

Moerke

[11] Patent Number: 4,656,329
[45] Date of Patent: Apr. 7, 1987

[54] ROTATABLE MOUNT PROVIDING COMMUNICATION BETWEEN MOUNTED DEVICE AND ASSOCIATED UTILITIES

[76] Inventor: Delford A. Moerke, 1020 Shady Oak Dr., North Mankato, Minn. 56001

[21] Appl. No.: 648,965

[22] Filed: Sep. 10, 1984

[51] Int. Cl.[4] .............................................. B23K 9/00
[52] U.S. Cl. .............................. 219/136; 219/137.41; 901/42
[58] Field of Search ........... 219/124.34, 125.1, 125.11, 219/136, 74, 75, 137.41; 901/41, 42; 269/57; 901/30

[56] References Cited

U.S. PATENT DOCUMENTS

| | | | |
|---|---|---|---|
| 4,142,084 | 2/1979 | Torrani | 219/125.11 |
| 4,168,406 | 9/1979 | Torrani | 219/137.41 |
| 4,309,809 | 1/1982 | Yokoe et al. | 901/30 |
| 4,467,175 | 8/1984 | Reeh et al. | 219/125.11 |

Primary Examiner—Clifford C. Shaw
Attorney, Agent, or Firm—Emrich & Dithmar

[57] ABSTRACT

A rotatable mount includes a support arm with a bearing block at one end having a cylindrical aperture therethrough in which is rotatably received a cylindrical housing. A fixed flange and a threadedly removable flange on the housing cooperate axially to retain the housing in the aperture. Annular surfaces on the housing and bearing block cooperate to form an annular chamber which provides continuous communication between a first passage in the housing and a second passage extending through the bearing block and the support arm. The housing has an axial bore in which is received a docking body to which associated welding apparatus can be quickly manually mounted and demounted. The housing is electrically insulated from the docking body. The passages may be used for removing smoke from a welding apparatus. The docking body has a longitudinal channel which communicates with a transverse opening through the housing externally of teh bearing block of accommodating cables, wires or the like for associated auxiliary equipment which might be mounted on the housing.

19 Claims, 7 Drawing Figures

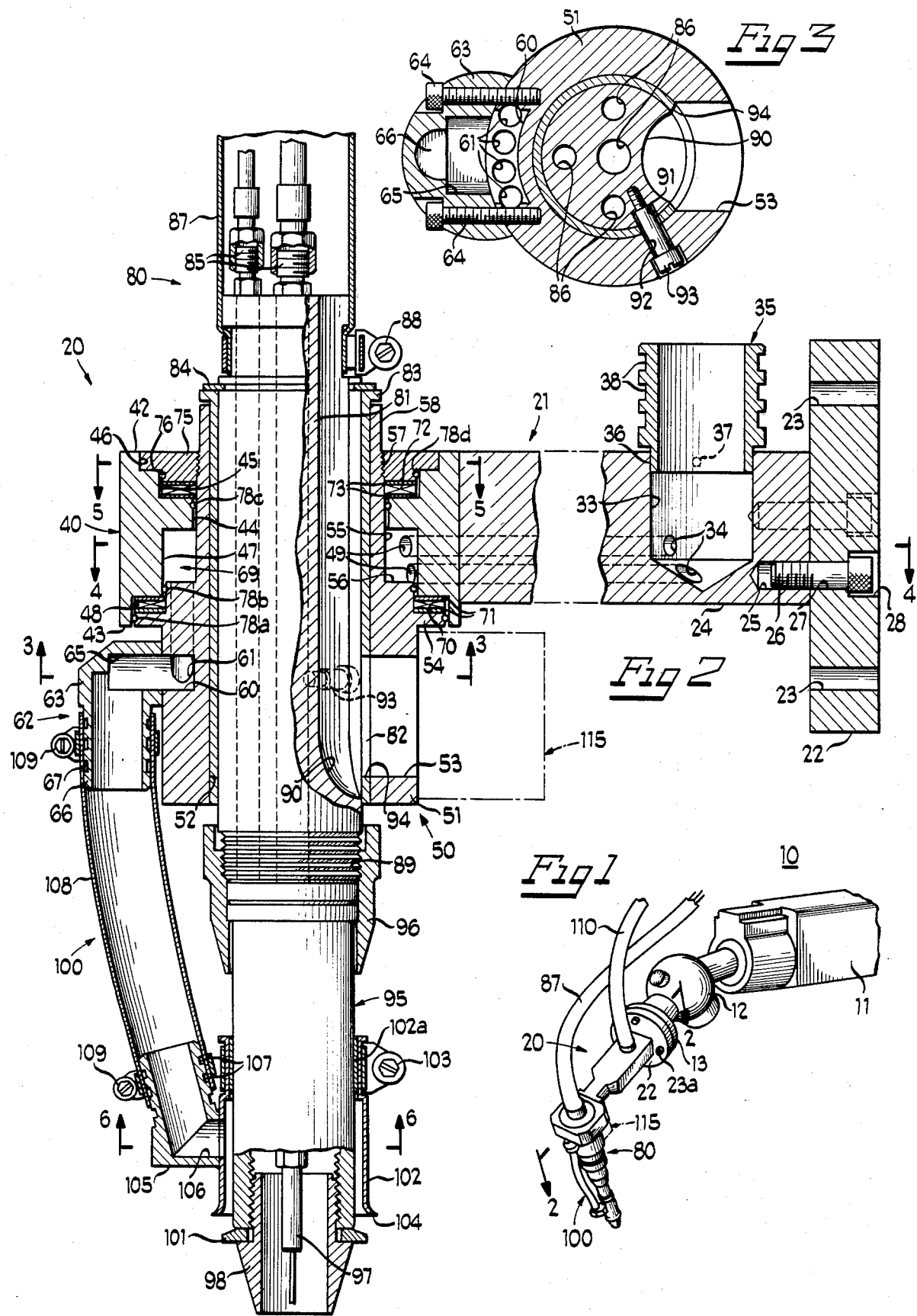

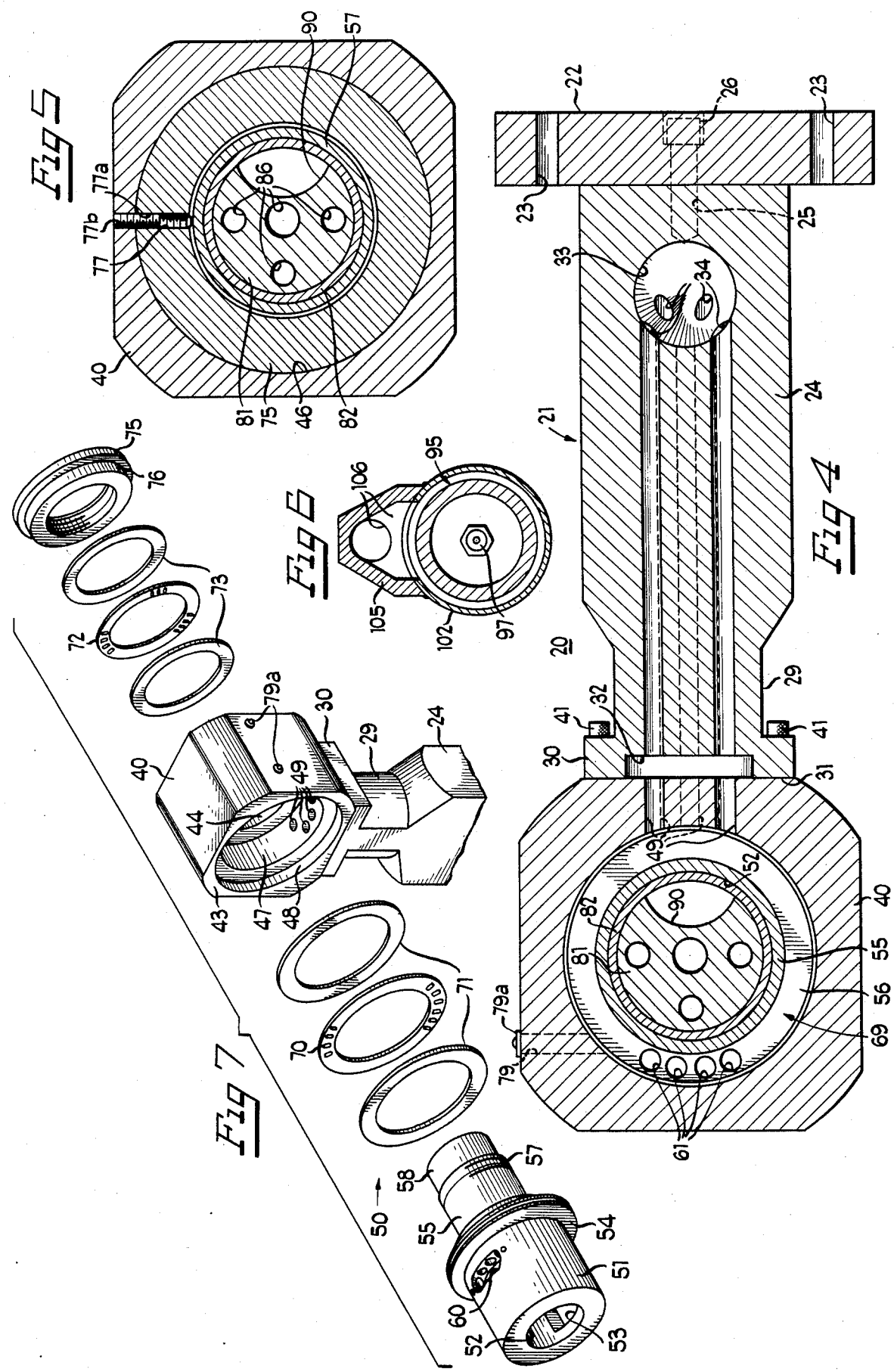

ROTATABLE MOUNT PROVIDING COMMUNICATION BETWEEN MOUNTED DEVICE AND ASSOCIATED UTILITIES

BACKGROUND OF THE INVENTION

The present invention relates to means for rotatably mounting equipment and, while the invention could be used for mounting any type of equipment, it has particular application to the mounting of arc welding equipment. In particular, the invention is useful in robotic welding applications.

Many types of manufacturing operations are now performed robotically. In such operations, a tool or the like is automatically manipulated by a robot machine under program control. Generally, the robot machine is capable of at least three types of motion, typically rotation about three different axes. Thus, for example, the robot machine may have a body rotatable about a first axis, an articulated arm mounted on the body for rotation about a second axis and a wrist carried by the arm for rotation about a third axis, the associated tool being mounted on the wrist. Thus, the tool moves with the wrist and can undergo as many degrees of movement as are permitted by the robot machine.

However, in such prior robotic systems, the tool is moved as a unit, undergoing either translational movement or swinging or pivotal movement about some axis external to the tool. There is generally no provision for rotating a tool about its own axis. Yet such rotational movement is frequently desirable or necessary. For example, in robotic welding, a welding gun carried by the robot machine is moved along a curved welding path. There may be certain accessory equipment, such as a tracking device or a cold wire feed, in the case of Tungsten Inert Gas ("TIG") welding, which should remain in a fixed position with respect to the welding gun, and yet at the same time retain a predetermined orientation with respect to the welding path which curves in varying directions. In such applications, it would be extremely useful to be able to rotate the welding gun about its axis so that, as the welding gun is translated along the weld path by the robot machine, it can maintain the auxiliary equipment in the predetermined orientation with respect to the weld path. Existing robotic systems do not afford this capability.

One difficulty with existing systems is that the robotically mounted tool is frequently provided with associated utilities services, such as electrical wiring, fluid supplies and the like through associated conduits and, if the tool is rotated about its axis, this results in twisting of the conduits and wrapping them around associated members of the robot machine, thereby seriously impeding movement of the robot machine.

SUMMARY OF THE INVENTION

It is a general object of the present invention to provide an improved rotatable mount, adaptable for use with robot machines or the like, which avoids the disadvantages of prior mounting arrangements, while affording additional structural and operating advantages.

An important object of this invention is the provision of a rotatable mount which permits mounting of an associated tool or other equipment so that it can be rotated about its own axis.

In connection with the foregoing object, it is another object of this invention to provide a rotatable mount of the type set forth, which permits auxiliary equipment to be rotated with the mounted tool.

Still another object of the invention is the provision of a rotatable mount of the type set forth, which facilitates the coupling of electrical or other utilities to the associated tool.

Still another object of the invention is the provision of a rotatable mount which permits simple and quick manual mounting and demounting of an associated tool or parts thereof.

These and other objects of the invention are attained by providing a rotatable mount comprising a support having a cylindrical aperture therethrough, a cylindrical housing coaxially receivable in the aperture in a mounting position for rotation with respect to the support, and means retaining the housing against axial movement from the mounting position with respect to the support, the housing having an axial bore therethrough for receiving associated equipment to be mounted.

The invention consists of certain novel features and a combinaion of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary perspective view of a portion of a robot machine having mounted thereon a rotatable mount, constructed in accordance with and embodying the features of the present invention, and rotatably mounting an associated arc welding unit;

FIG. 2 is an enlarged, fragmentary, sectional view, taken generally along the line 2—2 in FIG. 1, with portions broken away more clearly to show the structure;

FIG. 3 is a view in horizontal section taken along the line 3—3 in FIG. 2;

FIG. 4 is a view in horizontal section taken along the line 4—4 in FIG. 2;

FIG. 5 is a view in horizontal section taken along the line 5—5 in FIG. 2;

FIG. 6 is a view in horizontal section taken along the line 6—6 in FIG. 2; and

FIG. 7 is a fragmentary perspective exploded view of the rotatable housing of the present invention.

DESCRIPTION OF THE PREFERRED EMBODIMENT

Referring to FIG. 1 there is illustrated a portion of a robot machine, generally designated by the numeral 10, including a movable arm 11 provided at its distal end with a rotatable wrist 12. Carried on the wrist 12 is a mounting plate 13 on which is mounted a rotatable mount 20, constructed in accordance with and embodying the features of the present invention.

Referring also to FIGS. 2 and 4, the rotatable mount 20 includes a support, generally designated by the numeral 21, having a circular base 22 with a plurality of screw holes 23 therethrough for receiving associated screws or other threaded fasteners 23a (FIG. 1), securely to fasten the base 22 to the mounting plate 13. Preferably, the base 22 is formed of an electrically insulating material, such as a phenolic. The support 21 also includes an elongated extension arm 24, substantially rectangular in transverse cross section, provided at one end thereof with internally threaded bores 25 for receiving screws 26 which are also received through complementary bores 27 in the base 22, fixedly to secure the extension arm 24 to the base 22. Preferably, the bores 27 are counterbored, as at 28, so that the heads of the screws 26 will be completely recessed and the base 22 can be mounted flush against the mounting plate 13. The extension arm 24 is preferably formed of a metal, such as aluminum, although any other suitable material may be used.

The extension arm 24 is provided with a peripheral recess 29 adjacent to its distal end, defining an end flange 30 having a flat rectangular end surface 31. Formed in the end surface 31 is an oval recess 32. Extending transversely into one of the wider side walls of the extension arm 24 is a cylindrical lateral bore 33. Four longitudinal cylindrical bores 34 extend longitudinally through the extension arm 24, providing communication between the recess 32 and the bore 33. Disposed in the lateral bore 33 is a tubular output fitting 35, having a reduced-diameter end portion 36 which is telescopically received in the lateral bore 33 in close-fitting relationship therewith, being fixedly secured in place by a set screw 37. Formed in the outer surface of the fitting 35 are a plurality of longitudinally spaced-apart circumferential grooves 38, for a purpose to be explained more fully below.

Referring now also to FIG. 7 of the drawings, the support 21 also includes a generally rectangular bearing block 40, which may have rounded corners and which is secured by a plurality of threaded fasteners 41 (see FIG. 4) to the flange 30 on the extension arm 24. The recess 29 on the extension arm 24 provides clearance for an associated tool (not shown) for applying the fasteners 41. The bearing block 40 has a flat, generally rectangular entry surface 42 (see FIG. 2) and a flat, generally rectangular exit surface 43, respectively disposed on opposite sides of the bearing block 40 and parallel to each other. Extending through the bearing block 40 between the entry and exit surfaces 42 and 43 is a circularly cylindrical aperture 44, which has successively larger-diameter counterbore portions 45 and 46 at the entry end thereof and successively larger-diameter counterbore portions 47 and 48 at the exit end thereof (see FIGS. 2 and 7). Extending transversely into the bearing block 40 are four short cylindrical bores 49 which communicate with the counterbore portion 47 of the aperture 44. The bores 49 are disposed for communication with the recess 32 and respectively for alignment with the longitudinal bores 34 in the extension arm 24, when the bearing block 40 is securely mounted in place on the extension arm 24, as can best be seen in FIGS. 2 and 4.

Referring now to FIGS. 2-5 and 7, there is mounted on the support 22 a rotatable housing, generally designated by the numeral 50, which is generally cylindrical in shape and includes a cylindrical main body 51 having a cylindrical axial bore 52 extending therethrough (FIGS. 2 and 7). The main body 51 also has formed therein a transverse opening 53 extending generally radially thereinto and communicating with the axial bore 52. Integral with the main body 51 intermediate its ends and extending radially outwardly therefrom around the circumference thereof is a radial flange 54. The main body 51 is also provided with a reduced diameter portion 55 spaced a slight distance from the radial flange 54 and defining an annular shoulder 56. The reduced diameter portion 55 has an externally threaded portion 57 which is spaced from the adjacent end of the main body 51 by a further reduced-diameter portion 58.

Also formed in the outer surface of the main body 51 diametrically opposite the transverse opening 53 is an oval recess 60 (FIGS. 3 and 7), which communicates with four cylindrical bores 61 formed in the annular shoulder 56 and extending parallel to the longitudinal axis of the main body 51. Mounted on the main body 51 for communication with the recess 60 is an input fitting 62, having a mounting portion 63 which is fixedly secured by screws 64 (FIG. 3) to the main body 51. The mounting portion 63 has a cavity 65 therein which communicates with a tubular coupling portion 66 of the input fitting 62, the coupling portion 66 being provided on its outer surface with a plurality of longitudinally spaced-apart circumferential grooves 67 (FIG. 2).

The rotatable housing assembly 50 also includes an annular thrust bearing 70 disposed between two thrust washers 71 and seated in the counterbore portion 48 of the aperture 44, and an annular thrust bearing 72, disposed between two thrust washers 73 and seated in the counterbore portion 45 of the aperture 44 (FIGS. 2 and 7). The rotatable housing assembly 50 also includes a retaining or bearing adjustment ring 75, which is internally threaded and adapted for threaded engagement with the threaded portion 57 of the main body 51. The ring 75 has a reduced-diameter portion 76 dimensioned to be received in the counterbore portion 45 of the aperture 44 in the bearing block 40. A set screw 77 is recessed in a complementary bore 77a of the ring 75 and an aligned bore 77b of the bearing block 40 (FIG. 5) for locking the retaining ring 75 in place. O-ring seals 78a, 78b, 78c and 78d are provided, respectively, on the outer surface of the radial flange 54, on the main body 51 adjacent to the shoulder 56, on the smallest-diameter surface of the aperture 44 in the bearing block 40, and on the reduced-diameter portion 76 of the retaining ring 75 (FIG. 2). Also formed in the bearing block 40 are two lubricating bores 70 (one shown), respectively communicating with the counterbore portions 45 and 48 of the aperture 44 and being closed at their outer ends by resilient fittings 79a (FIGS. 4 and 7).

In assembling the rotatable housing assembly 50, the thrust bearing 70 and its associated thrust washers 71 are fitted over the reduced-diameter end of the main body 51 and seated against the radial flange 54. The main body 51 is then inserted into the aperture 44 in the bearing block 40, with the radial flange 54 being received in the counterbore portion 48. In this regard, it will be appreciated that the parts are dimensioned so that the O-ring 78a is disposed in sealing engagement with the cylindrical wall of the bearing block 40 in the counterbore portion 48, with the thrust bearing 70 and its associated thrust washers 71 being seated at the bottom of the counterbore portion 48 and held thereagainst by the radial flange 54, and with the outer surface of the radial flange 54 being substantially coplanar with the exit surface 43 of the bearing block 40. The O-ring seal 78b is disposed in sealing engagement with the cylindrical wall of the counterbore portion 47, while the O-ring seal 78c is disposed in sealing engagement with the reduced-diameter portion 55 of the main body 51.

The thrust bearing 72 and its associated thrust washers 73 are then received over the reduced-diameter portion 58 of the main body 51 and seated in the counterbore portion 45 of the aperture 44. Finally, the retaining ring 75 is threadedly engaged with the threaded portion 57 of the main body 51, with the retaining ring 75 being received in the counterbore portion 46 of the aperture 44, and with its reduced-diameter portion 76 being received in the counterbore portion 45 and sealed by the O-ring 78d. The retaining ring 75 is screwed on until it bears against the outer thrust washer 73 of the thrust bearing 72, thereby drawing the rotatable housing assembly 50 into tight seating engagement in the bearing block 40. It will be appreciated that, by adjustment of the position of the retaining ring 75, the force on the thrust bearings 70 and 72 can be varied. Preferably, however, the parts are designed so that when the outer surface of the retaining ring 75 is substantially coplanar with the entry surface 42 of the bearing block 40, the parts will be in their properly-adjusted mounted condition. The retaining ring 75 is then locked in place on the main body 51 with the set screw 77. In this regard, it will be appreciated that the parts are designed so that when they are in the proper mounted condition the axes of the bores 77b and 77c will be substantially coplanar so that they can be brought into radial alignment by rotation of the rotatable housing assembly 50.

It is a fundamental feature of the present invention that when the rotatable housing assembly 50 is thus mounted in place on the bearing block 40, it is freely rotatably about its longitudinal axis with respect to the bearing block 40. While no drive means has been shown, it will be understood that any desired type of rotational drive could be used. Such a drive could be coupled to the rotatable housing assembly 50 at the reduced diameter portion 58 of the main body 51 which projects outwardly beyond the bearing block 40.

An important aspect of the invention is that the depth of the counterbore portion 47 of the aperture 44 is such that its annular inner surface is spaced a substantial distance from the shoulder 56 on the main body 51 for cooperation therewith and with the reduced-diameter portion 55 of the main body 51 to define an annular cavity or passage 69, best seen in FIG. 2. The cavity 69 provides continuous communication between the bores 61 in the main body 51 and the bores 49 in the bearing block 40, regardless of the rotational position of the rotatable housing assembly 50. Accordingly, it can be seen that there is provided a continuous fluid passage from the input fitting 62, through the recess 60 and the bores 61 to the annular chamber 69 and thence through the bores 49 in the bearing block 40, and the recess 32 and the bore 33 and 34 in the extension arm 24 to the output fitting 35. The O-ring seals 78a-d protect the thrust bearings 70 and 72 from contaminants from outside the bearing block 40 or from the annular passage 69. Lubrication of the thrust bearings 70 and 72 is effected through the lubrication bores 79, the fittings 79a being resiliently biased to a closed sealing position when not in use to further portect the thrust bearings 70 and 72.

It is another significant aspect of the present invention that the rotatable mount 20 is designed for rotatably carrying an associated tool or other equipment. Referring now to FIGS. 1-6, there is illustrated an arc welding unit 80, adapted to be carried by the rotatable housing assembly 50 of the rotatable mount 20. The welding unit 80 includes an elongated cylindrical docking body 81 which is preferably formed of a solid block of metal, such as brass, and is adapted to be telescopically received in the axial bore 52 of the main body 51, being electrically insulated therefrom by a cylindrical insulating sleeve 82 provided with a short annular flange 83 extending radially outwardly therefrom at one end thereof. The docking body 81 is preferably provided with a split, resilient positioning ring 84 seated in a circumferential groove in the outer surface of the docking body 81, and adapted to bear against the flange 83 on the sleeve 82 for limiting the depth of insertion of the docking body 81 in the rotatable housing assembly 50. Thus, in assembly, the insulating sleeve 82 would first be dropped into the axial bore 52 until the flange 83 seats against the upper end of the main body 51, and then the docking body 81 is dropped into the insulating sleeve 82 until the positioning ring 84 seats against the flange 83, as is best seen in FIG. 2.

The docking body 81 is a slightly modified form of the type of docking body disclosed in my copending U.S. application Ser. No. 648,966, filed Sept. 10, 1984, and entitled Arc Welding System and Docking Assembly Therefor, now U.S. Pat. No. 4,582,979, which is adapted for receiving a water-cooled nozzle assembly, also disclosed in that application. However, the docking body 81 could also be of the general type disclosed in my copending U.S. application Ser. No. 648,967, filed Sept. 10, 1984, and also entitled Arc Welding System and Docking Assembly Therefor, now U.S. Pat. No. 4,600,824, which is adapted for receiving water-cooled machine barrels or curved gun assemblies.

The docking body 81 is provided at its input end with four fittings 85 which respectively communicate with passages 86 (FIG. 3) extending longitudinally through the docking body 81. The fittings 85 are respectively adapted to be coupled to associated condutis for supplying utilities such as consumable wire electrode, electrical power, arc shielding gas and cooling water, and for returning the cooling water to an associated drain, all as is explained in greater detail in the aforementioned copending application Ser. No. 648,966. These utilities conduits are preferably enclosed in a sheath 87 which is fixedly secured to the docking body 81 by a clamp 88. The other end of the docking body 81 has an externally threaded portion 89 which projects outwardly beyond the other end of the rotatable housing assembly 50.

Formed in the outer surface of the docking body 81 and extending from its input end to a point a predetermined distance from the output end is an elongated concave channel 90, dimensioned so as not to interfere with any of the passages 86 and to terminate within the main body 51 of the rotatable housing assembly 50. Also formed in the docking body 81 is a radial bore 91 (FIG. 3) disposed for radial alignment with a bore 92 in the main body 51 and a complementary aperture in the insulating sleeve 82 for receiving a set screw 93, fixedly to lock the docking body 81 in a mounted position, best illustrated in FIGS. 2 and 3, wherein the channel 90 communicates with the transverse opening 53 in the main body 51 through a corresponding aligned opening 94 formed in the insulating sleeve 82 (FIGS. 2 and 3).

Mounted on the docking body 81 at the output end thereof is a water-cooled nozzle assembly 95, the details of construction of which are disclosed in the aforementioned copending application Ser. No. 648,966. Generally, the nozzle assembly 95 is provided with plug-type water fittings (not shown) which are received in the lower ends of the water passages in the docking body 81 for opening check valves therein, the nozzle assembly 95 being secured in place by a cone nut 96 which is threadedly engaged with the threaded portion 89 of the docking body 81. The nozzle assembly 95 is of a generally tubular construction which receives therein an output fixture (not shown) on the docking body 81, which feeds the wire electrode through a suitable adapter to a contact tip 97, and feeds the shielding gas in surrounding relationship with the contact tip 97 to a gas nozzle 98. Different water-cooled nozzle assemblies are manually interchangeably mountable on the docking body 81.

The welding unit 80 is provided with a smoke pickup assembly 100 which includes a deflector ring 101 clamped in place by the gas nozzle 98 and extending radially outwardly therebeyond. The smoke pickup assembly 100 also includes a cylindrical collar 102 disposed in telescoping surrounding relationship with the nozzle assembly 95 and having a maximum inner diameter slightly greater than the outer diameter of the nozzle assembly 95 to define therebetween an annular passage. The collar 102 has a reduced-diameter portion 102a which may be provided with longitudinal slots (not shown) to permit frictional clamping to the nozzle assembly 90, as by a clamp 103. The outer end of the collar 102 is preferably outwardly flared, as at 104, the collar 102 being positioned with the flared end 104 spaced axially a predetermined distance from the deflector ring 101.

Integral with the collar 102 and projecting radially outwardly therefrom is a fitting 105 having a passage 106 therein which communicates with an opening in the collar 102, the fitting 105 being provided with circumferential grooves 107 in the outer surface thereof. A hose 108 has one end thereof received over the fitting 105 and the other end thereof received over the input fitting 62 on the rotatable housing assembly 50, the hose 108 being clamped in place on the fittings by clamps 109. A hose 110 is, in like manner, clamped in place over the output fitting 35 on the extension arm 24 (see FIG. 1), and is in turn coupled to an associated exhaust system (not shown).

The associated exhaust system establishes a suction in the hose 110 and smoke and fumes from the welding operation are drawn into the annular passage between the collar 102 and the end of the nozzle assembly 95, the deflector ring 101 serving to cause the smoke to be drawn in laterally from the side rather than directly axially from the tip, so as to prevent the shielding gas from also being sucked away from the welding arc. The smoke is then drawn through the fitting 105, the hose 108 and the fitting 62 into the bores 61 and the annular chamber 69, and thence through the bores 49 and 34 and 33 in the extension arm 24 and out through the output fitting 35 and the hose 110. It will be appreciated that rotation of the rotatable housing assembly 50 and the welding unit 80 do not in any way impede the smoke pickup operation, since the annular chamber 69 permits the intake portion of the smoke passage to rotate, while the output portion connected to the exhaust system is fixed with respect to the robot machine 10.

In many applications, it will be desirable to provide auxiliary equipment which must be maintained in a fixed orientation with respect to the welding unit 80, and yet permit rotation of the welding unit 80 about its longitudinal axis. Thus, for example, it may be desired to provide a tracking unit for following the weld path of the welding unit 80 or, in the case of TIG welding, it may be desirable to provide a cold wire feed. The present invention uniquely accommodates these requirements.

Referring to FIGS. 1 and 2, such auxiliary equipment is diagrammatically indicated in broken line at 115. This auxiliary equipment 115 is mounted on the main body 51 over the transverse opening 53 therein, so that it will rotate with the rotatable housing assembly 50 and remain fixed with respect to the welding unit 80. Thus, associated services or utilities, such as control conduits, or cold wire or the like can be fed through the transverse opening 53 and the opening 94 in the insulating sleeve 82, and then upwardly through the communicating channel 90 in the docking body 81 to the sheath 87, so as to avoid any problem of wrapping around the adjacent parts of the robot machine 10 as the welding unit 80 rotates.

In a constructional model of the present invention, the extension arm 24, the bearing block 40 and the rotating housing assembly 50 may all be formed of metal, such as aluminum, while the O-rings 78a–d may be formed of silicone or other suitable resilient material. The insulating sleeve 82 is formed of any suitable electrically insulating material. The insulating sleeve 82 and the insulating base 22 cooperate effectively to electrically insulate the welding unit 80 from the normal electrical grounding of the robot machine 10.

While the present invention has been disclosed for use with an arc welding unit 80, it will be appreciated that other types of tools or other equipment could be rotatably mounted on the rotatable mount 20, the welding unit 80 being shown simply for purposes of illustration. Similarly, while a particular form of arc welding 80 has been illustrated, it will be appreciated that other types of arc welding or other welding equipment could also be mounted on the rotatable mount 20.

From the foregoing, it can be seen that there has been provided an improved rotatable mount which is uniquely adaptable for use with robot machines to permit associated tools or other equipment to be mounted for rotation about their own axes, while at the same time providing a fluid path to the associated equipment through the rotatable mount, which path is continuously open regardless of the rotational position of the mount.

What is claimed is:

1. A rotatable mount comprising a support having a cylindrical aperture therethrough, a cylindrical housing coaxially receivable in said aperture in a mounting position for rotation with respect to said support, means retaining said housing against axial movement from said mounting position with respect to said support, said housing have an axial bore therethrough open at both ends thereof, an equipment body axially received in said bore and extending between and through the open ends of said bore and adapted to have an associated tool coupled thereto, and means on said housing for securing said body thereto.

2. The rotatable mount of claim 1, wherein said retaining means includes annular flanges on said housing engageable with said support adjacent to the opposite ends of said cylindrical aperture.

3. The rotatable mount of claim 2, wherein one of said annular flanges is threadedly engaged with said housing.

4. The rotatable mount of claim 3, and further including means for locking said threaded flange against rotation with respect to said housing.

5. The rotatable mount of claim 1, and further including bearing means disposed between said support and said housing.

6. The rotatable mount of claim 5, and further including seal means for sealing said bearing means.

7. The rotatable mount of claim 1, wherein said axial bore is circularly cylindrical in shape.

8. The rotatable mount of claim 1, wherein said housing extends beyond the ends of said support and has a transverse opening therein externally of said support and communicating with said bore.

9. A rotatable mount comprising a support having a first fluid passage therethrough, a housing having a second fluid passage therethrough, means rotatably mounting said housing on said support in a use condition, and means defining an annular chamber encircling said housing providing continuous communicatio between said first and second passages with said first fluid passage entering said chamber radially thereof and said second fluid passage entering said chamber axially thereof when said housing is mounted in the use condition thereof regardless of the rotational position thereof.

10. The rotatable mount of claim 9, wherein said support has a cylindrical aperture therethrough, said housing being cylindrical in shape and receivable coaxially in said aperture, said chamber defining means including two axially spaced-apart annular surfaces respectively formed on said support and said housing and extending radially thereof for cooperation therewith to define said annular chamber.

11. The rotatable mount of claim 9, wherein said support includes an elongated support arm and a bearing block carried by said support arm at one end thereof and having an aperture therethrough for receiving said housing therein, said first fluid passage extending through said support arm and said bearing block.

12. The rotatable mount of claim 9, and further including an input fitting carried by said housing and communicating with the outer end of said second fluid passage, and an output fitting carried by said support and communicating with the outer end of said first fluid passage.

13. A rotatable docking mount for arc welding apparatus adapted to be supplied with utilities such as welding potential, arc shielding gas, cooling fluid and consumable wire electrode, said docking mount comprising in combination: a support having a cylindrical aperture therethrough, a cylindrical housing coaxially receivable in said aperture in a mounting position for rotation with respect to said support, means retaining said housing against axial movement from said mounting position with respect to said support, said housing having an axial bore therethrough, a docking body freely receivable axially in said bore and having utilities passages therethrough, said docking body being provided at one end thereof with connecting means communicating with said passages and adapted for connection to associated utilities delivery means, said docking body being provided at the other end thereof with coupling means for accommodating quick manual mounting and demounting of associated welding apparatus and providing the associated utilities thereto.

14. The rotatable docking mount of claim 13, and further including positioning means carried by said docking body and engageable with said housing for limiting the depth of insertion of said docking body in said bore, accurately to position said docking body with respect to said housing.

15. The rotatable docking mount of claim 13 wherein said housing has a length greater than the axial length of said cylindrical aperture, and said housing has a transverse opening therein externally of said support communicating with said axial bore, said docking body having an elongated channel formed therein and extending longitudinally thereof for communication with said opening in said housing.

16. The rotatable docking mount of claim 13, wherein said support has a first fluid passage therethrough, said housing has a second fluid passage therethrough, and further including means providing continuous communication between said first and second passages when said housing is mounted in the mounting position thereof regardless of the rotational position thereof.

17. The rotatable docking mount of claim 16, and further including an input fitting carried by said housing and communicating with said second fluid passage at the outer end thereof.

18. The rotatable docking mount of claim 13, and further including locking means for preventing relative movement of said docking body and said housing.

19. The rotatable docking mount of claim 13, whrein said docking body and said housing are formed of metal, and further including means electrically insulating said docking body from said housing.

* * * * *